(12) United States Patent
Kögel et al.

(10) Patent No.: US 7,227,344 B2
(45) Date of Patent: Jun. 5, 2007

(54) SWITCHING DC-DC CONVERTER WITH IMPROVED STABILIZATION

(75) Inventors: Reinhard Kögel, Brigachtal (DE); Jean-Paul Louvel, Brigachtal (DE); Wolfgang Hermann, Tennenbronn (DE)

(73) Assignee: Thomson Licensing S.A., Boulogne, Billancourt (FR)

( * ) Notice: Subject to any disclaimer, the term of this patent is extended or adjusted under 35 U.S.C. 154(b) by 0 days.

(21) Appl. No.: 11/120,604

(22) Filed: May 3, 2005

(65) Prior Publication Data

US 2005/0248327 A1    Nov. 10, 2005

(30) Foreign Application Priority Data

May 5, 2004    (EP) .................................. 04010649

(51) Int. Cl.
*G05F 1/575*    (2006.01)
*G05F 1/46*    (2006.01)
(52) U.S. Cl. ...................................... 323/288; 323/282
(58) Field of Classification Search ................ 323/282, 323/288, 351, 224, 284, 285
See application file for complete search history.

(56) References Cited

U.S. PATENT DOCUMENTS 6,313,616 B1 *    11/2001    Deller et al. ................. 323/282
6,894,462 B1 *    5/2005    Fairbanks .................... 323/222

OTHER PUBLICATIONS

Search Report.
On Semiconductor: "mc34063; 1.5a, Step-Up/Down/Inverting Switching Regulators" Internet Article, 'Online! XP002299219 Apr. 2002.

* cited by examiner

*Primary Examiner*—Gary L Laxton
(74) *Attorney, Agent, or Firm*—Joseph J. Laks; Robert D. Shedd; William A. Lagoni

(57) ABSTRACT

The switching DC-DC converter comprises an inductor, a control circuit with an oscillator and an output stage, the output stage being coupled to the inductor, a diode coupled to the inductor, and a feedback loop for generating a stabilized output voltage. An output voltage of the output stage is coupled with an oscillator input of the control circuit, for example via an impedance, for synchronizing an oscillation cycle of the oscillator with a current pulse of the output stage.

10 Claims, 2 Drawing Sheets

SWITCHING DC-DC CONVERTER WITH IMPROVED STABILIZATION

This application claims the benefit, under 35 U.S.C. § 119 of European Patent Application 04010649.4, filed May 5, 2004.

FIELD OF THE INVENTION

The present invention relates to a DC-DC converter for the generation of a stabilized DC output voltage, the DC-DC converter comprising in particular a monolithic switching regulator subsystem.

BACKGROUND

For generating a stabilized DC output voltage, more and more switching regulators are used for DC-DC conversion, because of the high efficiency of the switching power supplies. New equipment designs and low parts costs with a simple design make the use of switching regulators more pronounced over that of linear regulators. A further advantage of a switching regulator is the increased application flexibility of the output voltage, which can be less than, greater than, or of opposite polarity to that of the input voltage.

When using a monolithic control circuit as a driver circuit for a switching transistor, only a few circuit parts are required for designing a DC-DC converter. Control circuits of this kind comprise an internal temperature compensated reference voltage, a comparator, a controlled duty cycle oscillator with an active current limit circuit, a driver stage and a high current output switch. A known monolithic control circuit of this kind is for example the integrated circuit MC34063 manufactured by ON Semiconductor Components Industries and Unisonic Technologies Co, or the integrated circuit μA78S40.

SUMMARY OF THE INVENTION

The switching DC-DC converter according to the invention comprises a monolithic control circuit with an oscillator and an output stage, an inductor, a diode and a feedback loop for generating a stabilized DC voltage. An output voltage of the output stage is coupled with an oscillator input of the control circuit for synchronizing an oscillation cycle of the oscillator with a current pulse of the output stage. With this arrangement, the duty time of the switching cycles of the DC-DC converter is fixed, and the regulation works via frequency modulation only.

The output stage is coupled in a preferred embodiment with a single impedance, for example a resistor, to the oscillator input. A current pulse of the output stage triggers therefore immediately the oscillator of the control circuit. Therefore, each minimum oscillator level starts with a switching cycle and ends at the maximum oscillator level. This leads to a frequency modulation by increasing or respectively decreasing the off-time of the switching cycles. Therefore, the stability of the DC-DC converter is increased, because oscillation cycles of the oscillator are no more ignored by the regulation due to the fact that the oscillation cycles are synchronized.

In an improved embodiment, the oscillator input is coupled to a comparator input of the control circuit for providing a modulation of the input voltage for the comparator with the oscillator frequency. This modulation can be done for example by a simple transistor stage, creating a ripple voltage. Via this modulation, the regulation system is independent of any ripple voltage present on the output voltage, which is coupled via the feedback loop to the comparator input for stabilization. With this embodiment therefore, a modulation of the regulation system by big output load variations is avoided.

BRIEF DESCRIPTION OF THE DRAWINGS

Preferred embodiments of the invention are explained in more detail with regard to schematic drawings, which show.

DETAILED DESCRIPTION OF PREFERRED EMBODIMENTS

Figure 1:
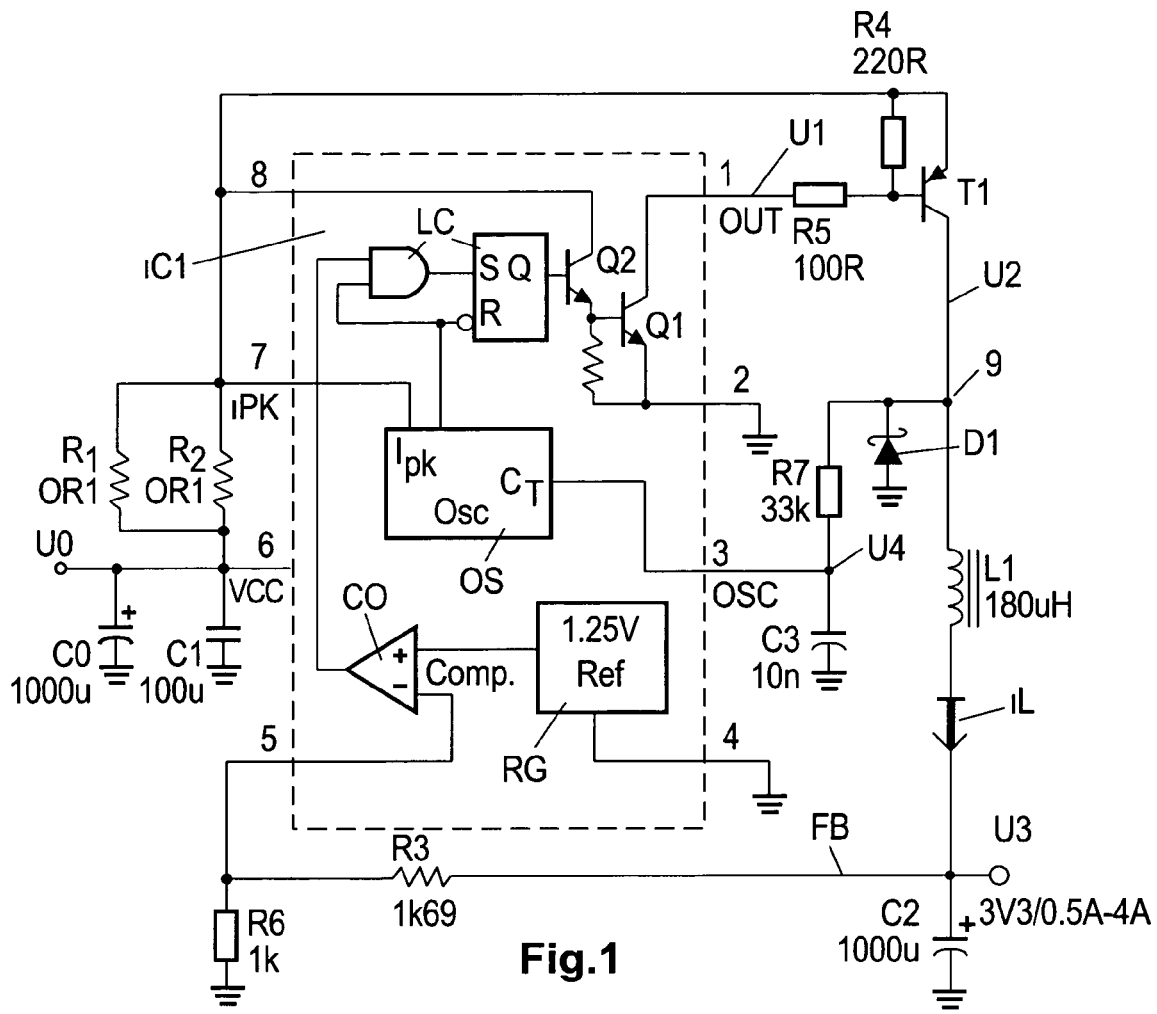
FIG. 1 a switching DC-DC converter with a monolithic control circuit, the converter operating as a step-down converter, FIGS. 2a, 2b voltage diagrams showing the operation of the DC-DC converter of the FIG. 1 without oscillator synchronization, FIGS. 3a, 3b voltage diagrams showing the operation of the DC-DC converter of the FIG. 1 with oscillator synchronization, and FIG. 4 the DC-DC converter as shown in FIG. 1, comprising in addition a modulation circuit for modulating the comparator input signal.

In FIG. 1 a switching DC-DC converter is shown comprising an inductor L1, a diode D1 and a monolithic control circuit IC1, for providing a stabilized DC output voltage U3. The inductor L1 is in particular a coil. The control circuit IC1 is in this embodiment an integrated circuit MC34063A.

The control circuit IC1 comprises a reference voltage generator RG and a comparator CO for the regulation of the output voltage U3. It comprises further an oscillator OS, having an input 3, to which a capacitor C3 is coupled for defining the oscillation frequency of the oscillator OS. The control circuit IC1 comprises further a logic circuit LC and an output stage with a driver transistor Q2 and an output switch Q1, the transistor Q2 driving the output switch Q1. The comparator CO and the oscillator OS are coupled to the logic circuit LC for operating the driver transistor Q2 and the output switch Q1.

The control circuit IC1 operates with a supply voltage U0, coupled to current inputs 6, 7 and 8 of the control circuit IC1. Via low resistance resistors R1 and R2 coupled in parallel between pin 6 and pin 7 of the control circuit IC1, an overload protection is provided for the DC-DC converter. A switching power transistor T1 is coupled with a current input to resistors R1, R2, with a current output to the coil L1, and with a control input via a resistor R5 to pin 1 of the control circuit IC1, to which pin the current input of the output switch Q1 is coupled. A resistor R4 is coupled between the current input and the control input of the power transistor T1, for keeping the transistor T1 closed, when the output switch Q1 is blocked.

A freewheeling diode D1 is coupled between ground and a node 9 between the current output of transistor T1 and coil L1. The coil L1 is coupled with a second terminal to an output capacitor C2, which provides a smoothing of the output voltage U3. The voltage U3 is coupled via a voltage divider, resistors R3 and R6, and pin 5 to the comparator CO of the control circuit IC1, for providing a feedback loop FB for the operation of the DC-DC converter.

The circuit as described above is known and similar circuits are suggested in application sheets of IC manufacturers. According to the invention, an output voltage of the output stage Q2, Q1 is coupled with the oscillator input 3 of the control circuit IC1 for synchronizing the oscillation cycles of the oscillator OS with the current pulses of the output stage.

In the preferred embodiment shown in FIG. 1, the node 9 is coupled in addition to the oscillator input 3 of IC1, for coupling the output voltage of the output stage Q2, Q1 via the power transistor T1 with the oscillator input 3. The oscillator input 3 may be coupled also in another embodiment via an inverter directly with the pin 1 of the output stage Q1. It may be coupled also to the output pin 2 of the control circuit IC1, for example, when a resistor is coupled between pin 2 and ground. But in the embodiment as shown in FIG. 1, only a single impedance, a resistor R7, is used.

Without the resistor R7, the operation of the DC-DC converter is as follows: Via the feedback loop FB, the comparator CO provides regulating pulses for the logic circuit LC. The transistor Q2 and the output switch Q1 are opened and closed accordingly by the logic circuit LC. The value of output voltage U3 is defined by the voltage at pin 5 as provided via the resistors R3 and R6, which voltage is compared with the reference voltage of the reference voltage generator RG. Is the voltage U3 too low, the power transistor T1 is opened for providing a current to the coil L1. When the transistor T1 closes, the energy stored in the coil L1 is discharged via diode D1, until coil L1 is discharged or the next current pulse via transistor T1 is provided.

In case of a high output load, the DC-DC converter operates with a high pulse-width modulation ratio (PWM) and a high frequency, and in case of a low output load, operates respectively with a low PWM ratio and a lower frequency. The switching on of Q1, Q2 and T1 is in particular triggered by the comparator CO, when the output voltage U3 is too low and a positive signal is provided by the oscillator OS to an AND gate of the logic circuit LC. Therefore, in case of a low load, it is possible that no switching cycles occur during oscillation cycles, because the comparator CO outputs no signals, when the voltage at pin 5 is higher than the internal reference voltage 1.25 V. This can lead to switching frequencies, which are below 20 kHz und therefore in the hearable frequency range.

Figure 2A:
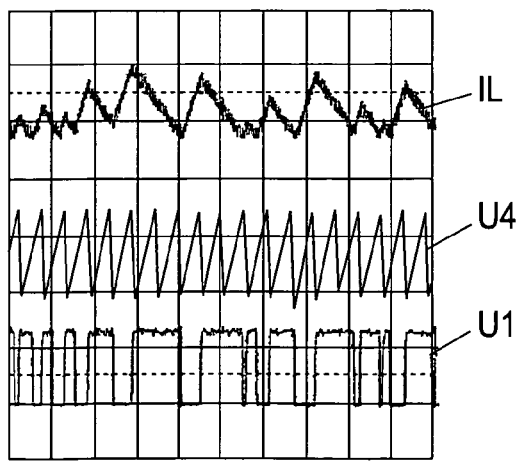
Figure 2B:
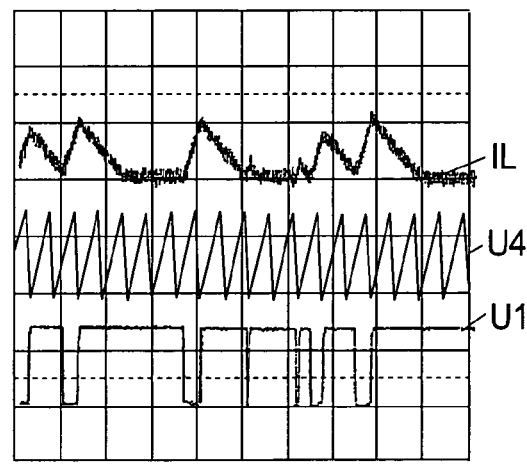

The behavior of the DC-DC converter without the synchronization via the resistor R7 is shown in FIG. 2a, which shows the operation in a high power continuous mode, and in FIG. 2b, showing the operation in a low power discontinuous mode. The FIGS. 2a and 2b show the voltage U4 at pin 3 and the voltage U1 at pin 1 of IC1, and the current IL through the coil L1. As can be seen, when the voltage U1 is low, an increasing current IL is flowing via transistor T1 and the coil L1 for charging the capacitor C2, and when the voltage U1 is high, the current IL through the coil L1 is decreasing. The switching-off of the transistor T1, when the voltage U1 switches from low to high, coincides always with a decrease of the oscillator voltage U0. But the switching-on of the transistor T1 is controlled via the feedback loop FB by the comparator CO.

When the node 9 is coupled via resistor R7 to pin 3, the switching through of transistor T1 leads to a charging of capacitor C3, and leads to a discharging, when transistor T1 is closed and coil L1 is discharged. By adding the resistor R7, the regulation system is therefore changed completely. The duty time of the IC1, in which the transistor T1 is switched through, is now about constant during the complete output power range, and the frequency variation is comparatively low as compared with the circuit without resistor R7.

Figure 3A:
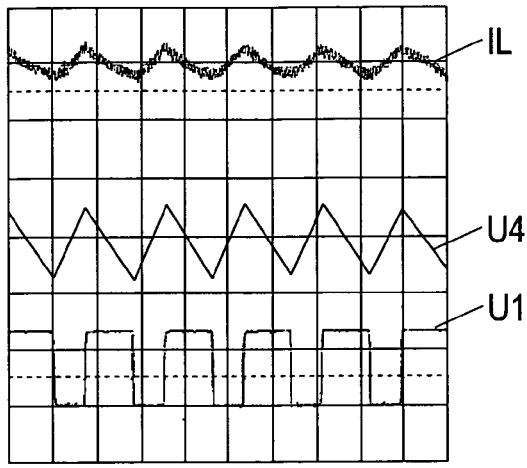
Figure 3B:
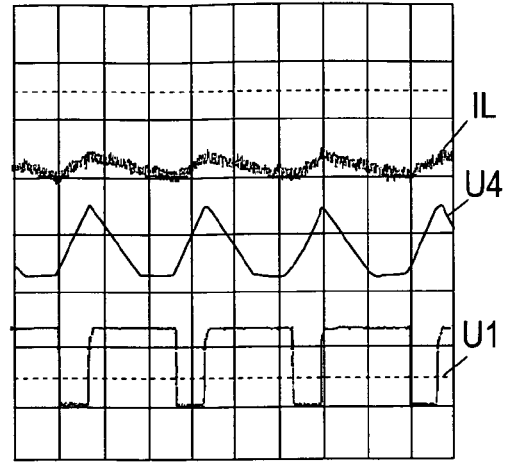

The operation of the DC-DC-converter is therefore completely different, when the oscillation frequency of the oscillator OS is synchronized with the current pulses of the output stage Q1 via the resistor R7, therefore synchronized with the current IL through the coil L1. In the FIG. 3a the operation of the DC-DC-converter with 4 Amperes output current in a continuous mode and in FIG. 3b with a low output current of 0.3 Amperes in a discontinuous mode is shown, operating with the resistor R7. As can be seen, the current pulses IL of the coil L1 are synchronized with the oscillator voltage U4 at pin 3 and are therefore corresponding to the periodic behavior of the oscillator voltage U4.

Also, the switching through period of the transistor T1 is constant for high load and for low load, but the switching-off period of the transistor T1 depends on the load. Therefore, every switching through phase starts at the minimum oscillator level of the voltage U4, and ends with the maximum oscillator level of voltage U4. The on-time of the transistor T1 is therefore fixed. The regulation is done only by modulation of the off-time of the transistor T1, and hence by a variation of the frequency. No oscillator cycles are anymore ignored, the regulation is done now in a linear fashion by increasing, respectively decreasing the off-time of the transistor T1.

Figure 4:
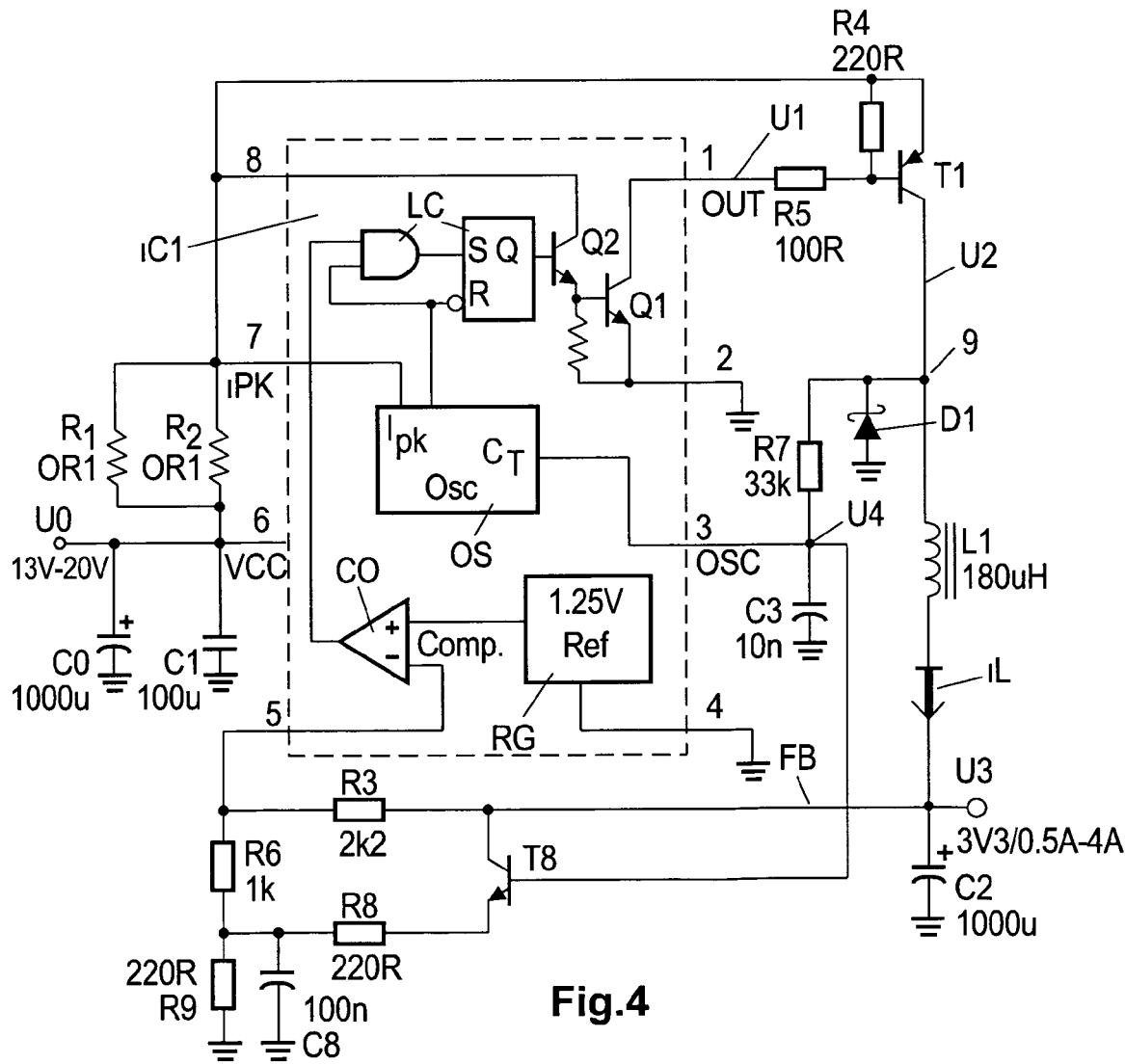

The operation of the DC-DC-converter is further improved, when a modulation generator is included, as shown in FIG. 4. The circuit of FIG. 4 is similar to the DC-DC converter of FIG. 1, but comprises in addition a transistor T8, coupled with a control input to the capacitor C3 and pin 3, and with a current input to the output voltage U3, as provided by capacitor C2. The current output of transistor T8 is coupled via a resistor R8 to a RC combination, a capacitor C8, to which a resistor R9 is connected in parallel. The RC combination is connected further in series with the resistor R6.

The operation of the modulation generator is as follows: The upper threshold of the oscillator OSC is used to charge up the capacitor C8 via the transistor T8. After the falling down time of the oscillator voltage U4, the oscillator OSC gives the release to a latch internally to the logic circuit LC, whereas the voltage across capacitor C8 is still falling. The time constant of the RC combination, capacitor C8 and resistor R9, is big enough, that the waveform across capacitor C8 looks still like a saw-tooth. When the voltage at the comparator input, pin 5, is lower than the internal voltage reference, a new switching cycle starts and ends only when the upper level at the oscillator at pin 3 is reached again. Then the capacitor C8 is charged up again.

The charging and discharging of capacitor C8 creates therefore a ripple voltage, which is coupled to the feedback voltage, applied at the comparator input pin 5. This modulated signal is given directly to the comparator input 5. The modulation generator operates therefore with the same oscillation frequency as present at pin 3 of the IC1.

With the modulation generator, the regulation of the DC-DC converter is independent of any ripple voltage present on the output voltage U3. This can be the case, when the load coupled to the output voltage U3 operates with a periodic and large pulse variation. The output load variation is not in phase to the ripple voltage generated by the modulation generator, and therefore the DC-DC converter cannot be modulated by a periodic load variation of the load coupled to the capacitor C2, when the modulation generator is included.

The present invention is not limited to the embodiments as described with regard to the figures, and various available modifications come possible for those skilled in the art without departing from the scope of the invention. Particularly, the modulation generator and the synchronization of the output voltage of the output stage with the oscillator input of the control circuit may be used for all kinds of switched mode power supplies, and is not limited to a step-down converter. The DC-DC converter may operate with or without an external power switching transistor T1.

The invention claimed is:

1. Switching DC-DC converter comprising:
   an inductor;
   a control circuit with an oscillator and an output stage providing a first output voltage, the output stage being coupled to the inductor;
   a diode coupled to the inductor, a feedback loop for generating a second stabilized DC output voltage; and
   a capacitor coupled to an input of the oscillator, wherein the first output voltage is coupled also with the oscillator input for synchronizing an oscillation cycle of the oscillator with a current pulse of the output stage such that the duty time of a switching cycle of the DC-DC converter is fixed.

2. Switching DC-DC converter in accordance with claim 1, wherein the first output voltage is provided by an output switch of the output stage or via a switching transistor coupled to the output stage.

3. Switching DC-DC converter in accordance with claim 1, wherein the first output voltage is coupled via an impedance to the capacitor.

4. Switching DC-DC converter in accordance with claim 1, wherein the control circuit is a integrated monolithic control circuit comprising an internal reference voltage generator, a comparator, a controlled duty cycle oscillator, a logic circuit coupled to the output stage, and an input of the comparator being coupled with a reference voltage of the reference voltage generator.

5. Switching DC-DC converter in accordance with claim 1, wherein a DC input voltage is applied to an input of the control circuit, the first output voltage coupled to a first terminal of the inductor, a second terminal of the inductor being coupled to an output capacitor for providing the stabilized DC output voltage, the DC output voltage being coupled to a control input of the control circuit via the feedback loop, and the diode being coupled between ground and the first terminal of the inductor for the operation as a step-down converter.

6. Switching DC-DC converter in accordance with claim 1, further comprising a power switching transistor which is coupled with a control input to an output of the output stage, with a current input to an input voltage, and with a current output to the inductor.

7. Switching DC-DC converter comprising:
   an inductor;
   a control circuit with an oscillator and an output stage providing a first output voltage, the output stage being coupled to the inductor;
   a diode coupled to the inductor; and
   a feedback loon for generating a second, stabilized DC output voltage, wherein the first output voltage is coupled with an input of the oscillator for synchronizing an oscillation cycle of the oscillator with a current pulse of the output stage and wherein the DC-DC converter comprises further a modulation generator coupled with an input to the oscillator input and coupled with an output to a comparator input of the control circuit.

8. Switching DC-DC converter in accordance with claim 7, wherein the modulation generator comprises a switching stage coupled with a control input to the oscillator input and with a current output to a RC-combination, the RC-combination being coupled further to the comparator input.

9. Switching DC-DC converter in accordance with claim 8, wherein a current input of the switching stage is coupled to the output voltage.

10. Switching DC-DC converter in accordance with claim 7, wherein the modulation generator operates with the same oscillation frequency as the oscillator.

* * * * *